United States Patent Office

3,594,405
Patented July 20, 1971

3,594,405
SUBSTITUTED PYRANYL ANILINES AS PLANT GROWTH MODIFIERS
Harvey M. Loux, Valley View, Hockessin, Del., assignor to E. I. du Pont de Nemours and Company, Wilmington, Del.
No Drawing. Filed May 17, 1968, Ser. No. 729,900
Int. Cl. C07d 7/04
U.S. Cl. 260—345.1                    3 Claims

ABSTRACT OF THE DISCLOSURE

This disclosure teaches that novel 2-tetrahydropyranyl-anilines such as 3,4-dichloro-N-(tetrahydro-2-pyranyl)-aniline when applied to plants effect a modification of the growth pattern of said plant.

SUMMARY OF THE INVENTION

This invention relates to novel tetrahydropyranylanilines, to the method of using said tetrahydropyranyl anilines to modify plant growth and to compositions containing said tetrahydropyranyl-anilines as the active ingredient therein.

The compounds of this invention are represented by the following formula (1)
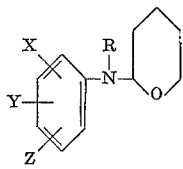

where:

R is hydrogen or alkyl of one through four carbons;
X is halogen;
Y is hydrogen, chlorine, bromine, alkyl of one through four carbons, alkoxy of one through four carbons, $NO_2$ or $CF_3$; and
Z is hydrogen or chlorine.

Preferred compounds of this invention because of their excellent plant growth regulant activity are those compounds of Formula 1 where R is hydrogen, X is chlorine, Y is chlorine, and Z is hydrogen or chlorine.

The most preferred compound of this invention is 3,4-dichloro-N-(tetrahydro-2-pyranyl)aniline.

This invention, as stated above, relates to a method for modifying plant growth which comprises applying one or more compounds of this invention to the plant or the locus of the plant to be treated. One preferred aspect of this invention relates to a method for increasing fruit production in fruit-bearing plants which comprises applying an effective amount of one or more compounds of this invention to the plant or to the locus of the plant to increase the fruit production of said plant.

This invention further relates to plant growth regulant compositions suitable for application to plants to modify the growth pattern of said plants as herein described, said composition being composed of an effective amount of a compound of Formula 1 in combination with suitable agricultural adjuvants and modifiers.

DESCRIPTION OF THE INVENTION

The compounds of Formula 1 are useful for the control of plant growth. As such, they can be used in a variety of ways to modify and regulate plant growth patterns. The compounds of this invention can be used to increase the number of flowers produced on plants. They can be used to increase the number of fruit which a plant will produce. They can also be used to change other growth habits of plants. For example, the compounds of Formula 1 can be used to change the growth habit of some plants resulting in shorter and more compact plants.

The compounds of this invention are particularly effective as plant growth regulants on members of the legume family. They can be used to modify the growth pattern to increase the yield of legumes such as the soybean, snapbean, dry bean, lima bean, peas and others.

Preparation

The compounds of this invention can be prepared by the reaction of dihydropyran with a suitably substituted aniline as illustrated in the following equation.

(2)
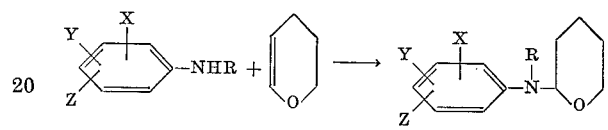

where X, Y, Z and R are defined previously for Formula 1.

To obtain the tetrahydropyranylanilines by the above method, the substituted aniline and dihydropyran are stirred for ½ to 20 hours at a temperature of from 10–150° C. in a suitably inert solvent such as dioxane or benzene. A small amount of a mineral acid catalyst such as sulfuric acid or a Lewis acid catalyst such as mercuric chloride is also employed. The mixture is washed with aqueous base to remove the catalyst and the product is isolated by conventional procedures such as crystallization or distillation.

Alternatively, the compounds of this invention can be prepared by reacting an appropriately substituted aniline with 2-(dimethylamine)tetrahydropyran or 2-(methylamine)tetrahydropyran. This reaction is represented by the following equation.

(3)
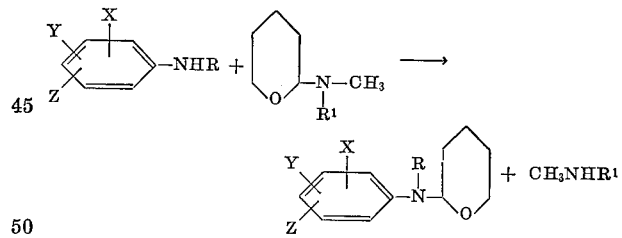

where X, Y, Z and R are defined previously for Formula 1 and $R^1$ is hydrogen or methyl.

To obtain the tetrahydropyranylaniline by the above reaction, the substituted aniline and 2-aminotetrahydropyran are heated under reduced pressure at a temperature of from 50–130° C. until the theoretical amount of amine is driven off. The pot residue is almost pure product which can be recrystallized if further purification is desired or it can be used directly in plant growth modifying compositions. The preparation of some of the compounds of Formula 1 is facilitated by the presence in the reaction mixture of a catalytic amount of ammonium chloride.

The 2-aminotetrahydropyran used in the above reaction can be prepared by the reaction of an amine with 2-hydroxytetrahydropyran as described in A. Gaumeton, Ann. Chim., 8(7–8), 457 (1963). The 2-hydroxytetrahydropyran is prepared by reacting dihydropyran with water as described in R. Paul, Bull Soc. Chim., I (5), 971 (1934).

The following examples are presented to further illustrate this invention. Parts and percentages are by weight unless otherwise indicated.

EXAMPLE 1

3,4-dichloro-N-(tetrahydro-2-pyranyl)aniline

To a solution of 162 parts 3,4-dichloroaniline and 4 parts mercuric chloride in 1000 parts dioxane is gradually added 172 parts dihydropyran. The resulting solution is allowed to stand at room temperature for 25 hours, is then refluxed for one hour and is then cooled. The cooled solution is stirred for thirty minutes with 750 parts 2 N aqueous sodium hydroxide and extracted with ether. The ether extracts are washed with water, stripped of solvent and distilled at 145–160° C./0.5 mm. of Hg; one hundred twelve parts of 3,4-dichloro-N-(tetrahydro-2-pyranyl) aniline as a pale yellow oil that crystallizes to a yellow solid melting at 63–71° C. Recrystallization gives pure 3,4-dichloro - N - (tetrahydro - 2 - pyranyl)aniline, M.P. 74–76° C.

The "Products" listed below can be prepared according to the procedure of Example 1 when the indicated "Aniline" is substituted for the 3,4-dichloroaniline of Example 1.

| Aniline | Product |
| --- | --- |
| 2,3,6-trichloroaniline | 2,3,6-trichloro-N-(tetrahydro-2-pyranyl)aniline. |
| o-Fluoroaniline | 2-fluoro-N-(tetrahydro-2-pyranyl)aniline. |
| 3,4-dibromoaniline | 3,4-dibromo-N-(tetrahydro-2-pyranyl)aniline. |
| 3-chloro-4-nitroaniline | 3-chloro-4-nitro-N-(tetrahydro-2-pyranyl)aniline. |
| 2-chloro-4-nitroaniline | 2-chloro-4-nitro-N-(tetrahydro-2-pyranyl)aniline. |
| 4-chloro-3-trifluoromethylaniline | 4-chloro-3-trifluoromethyl-N-(tetrahydro-2-pyranyl)aniline. |
| 3-chloro-4-n-butylaniline | 3-chloro-4-n-butyl-N-(tetrahydro-2-pyranyl)aniline. |
| p-Chloroaniline | 4-chloro-N-(tetrahydro-2-pyranyl)aniline. |
| 2,6-dichloroaniline | 2,6-dichloro-N-(tetrahydro-2-pyranyl)aniline. |
| p-Iodoaniline | 4-iodo-N-(tetrahydro-2-pyranyl)aniline. |
| 4-bromo-2-chloroaniline | 4-bromo-2-chloro-N-(tetrahydro-2-pyranyl)aniline. |
| 4-chloro-m-toluidine | 4-chloro-N-(tetrahydro-2-pyranyl)-m-toluidine. |
| 2-fluoro-p-toluidine | 2-fluoro-N-(tetrahydro-2-pyranyl)-p-toluidine. |
| 3,4-dichloro-N-methylaniline | 3,4-dichloro-N-methyl-N-(tetrahydro-2-pyranyl)aniline. |
| 4-chloro-N-butylaniline | 4-chloro-N-butyl-N-(tetrahydro-2-pyranyl)aniline. |
| 3-bromo-N-ethylaniline | 3-bromo-N-ethyl-N-(tetrahydro-2-pyranyl)aniline. |

EXAMPLE 2

3,4-dichloro-N-(tetrahydro-2-pyranyl)aniline

A mixture of 162 parts 3,4-dichloroaniline and 135 parts 2-(dimethylamino)tetrahydropyran is gradually heated to 110° C. while the pressure is gradually lowered to 10 mm. at such a rate that a mild reflux is maintained. After a period of 150 minutes, the theoretical amount of dimethylamine is recovered (45 parts).

Five parts of 2-(dimethylamino)tetrahydropyran is recovered by lowering the pressure to 1 mm. Recrystallization of the pot residue from hexane gives 225 parts of pure 3,4-dichloro-N-(tetrahydro-2-pyranyl)aniline, M.P. 76.5–78° C.

Formulation and application.—Compositions of this invention suitable for practical use as plant growth regulants will include, in addition to one or more compounds of Formula 1, surface active agents, solid or liquid diluents and other materials as desired to produce wettable powders, dusts, granules or liquid concentrates.

The surface active agents used in preparing the formulations of this invention can be wetting, dispersing or emulsifying agents. They may act as wetting agents for wettable powders and dusts, as dispersing agents for wettable powders and suspensions, and as emulsifying agents for emulsifiable concentrates. Surfactants may also enhance the biological activity of the substituted pyranyl anilines of this invention. Such surface active agents can include such anionic, cationic and nonionic agents as have heretofore been generally employed in pest control compositions of similar type. Suitable surface active agents are set out, for example, in "Detergents and Emulsifiers Annual—1967" by John W. McCutcheon, Inc. Other surface active agents not listed by McCutcheon, but still effective dispersants by virtue of protective colloid action include methyl cellulose, polyvinyl alcohol, hydroxyethyl cellulose, and alkyl substituted polyvinyl pyrrolidines.

Suitable surface active agents for use in compositions of this invention include polyethylene glycol esters with fatty and rosin acids; polyethylene glycol ethers with alkyl phenols or with long-chain aliphatic alcohols; polyethylene glycol ethers with sorbitan fatty acid esters; and polyoxyethylenethio ethers. Other suitable surfactants include amine, alkali and alkaline earth salts of alkylaryl sulfonic acids; amine, alkali and alkaline earth fatty alcohol sulfates; dialkyl esters of alkali metal sulfosuccinates, fatty acid esters of amine, alkali and alkaline earth isethionates and taurates; amine, alkali and alkaline earth salts of lignin sulfonic acids; methylated or hydroxyethylated cellulose; polyvinyl alcohols; alkyl substituted polyvinyl pyrrolidine; amine, alkali and alkaline earth salts of polymerized alkyl-naphthane sulfonic acids; and long-chain quaternary ammonium compounds. Anionic and nonionic surface active agents are preferred.

Among preferred wetting agents are sodium alkylnaphthalene sulfonates; sodium dioctylsulfosuccinate; sodium dodecylbenzene sulfonate; ethylene oxide condensates with alkylated phenols such as octyl; nonyl- and dodecylphenol; sodium lauryl sulfate; and trimethylnonyl polyethylene glycols. Among preferred dispersing agents are sodium, calcium and magnesium lignin sulfonates; low-viscosity methyl cellulose; low-viscosity polyvinyl alcohol; alkylated polyvinyl pyrrolidine; polymerized alkyl naphthalene sulfonates; sodium N-oleyl or N-lauryl isethionates; sodium N-methyl-N-palmitoyl taurate, and dodecylphenol polyethylene glycol ethers.

Among preferred emulsifying agents are ethylene oxide adducts of lauric, oleic, palmitic or stearic acid esters of sorbitan or sorbitol; polyethylene glycol esters with lauric, oleic, palmitic, stearic or rosin acids, oil-soluble alkylarylsulfonates, oil-soluble polyoxyethylene ethers with octyl, nonyl and dodecylphenol, polyoxyethylene adducts to long-chain mercaptans, and mixtures of these surfactants.

(A) Wettable powders.—Wettable powders are compositions which usually contain inert solid diluents in addition to surfactants. These inert diluents may serve several purposes. They can act, as grinding aids to prevent mill smear and screen blinding, they can aid rapid dispersion of the mix when placed in water, they can adsorb liquid or low melting solid active material to produce a free flowing solid product, they can prevent agglomeration into lumps upon prolonged hot storage and they can permit preparation of compositions with a controlled amount of active ingredient so that proper dosage is easily measured by the consumer.

Suitable diluents can be either inorganic or organic in in origin. These include the natural clays, diatomaceous earth, synthetic mineral fillers derived from silica or silicates, insoluble salts produced by precipitation in fluffy form such as tricalcium phosphate or calcium carbonate, and powdered organic diluents such as shell flours, wood flours, or corn cob flour. Preferred fillers for the compositions of this invention include kaolin clays, attapulgite clay, nonswelling calcium magnesium montmorillonites, synthetic silicas, synthetic calcium and magnesium silicates, sodium or calcium silica aluminates and diatomaceous silica.

Wettable powders will normally contain both a wetter and a dispersant. Most preferred for dry wettable powders are those anionic and nonionic surfactants which exist in solid form. Occasionally a liquid, nonionic surfactant, normally considered an emulsifying agent can be used to produce both wetting and dispersion.

Wetting and dispersing agents in wettable powders of this invention, when taken together, will comprise from about 0.5 weight percent to 5.0 weight percent of the total composition. The active component will be present at a concentration of from about 25% to 80% and diluent makes up the blance to 100%. Where needed, a corrosion inhibitor or foaming inhibitor can be added at rates of 0.1% to 1.0% with a corresponding reduction in diluent.

(B) Dusts.—Dust compositions are those intended for application in dry form with suitable dusting equipment. Since wind drift is undesirable when applying dusts, the most suitable dust diluents are those which are dense and rapid settling. These include kaolinites, talcs, pyrophyllites, ground phosphate rock, Serecite, and ground tobacco stems. However, dusts are usually most easily prepared by diluting an existing high-strength wettable powder with a dense diluent so that the final dust will frequently contain a fraction of light, adsorptive diluent as well as the more desirable dense filler.

A wetting agent is desirable in dust formulations so that adhesion to dew-covered foilage is enhanced. Dusts made from wettable powders will usually contain sufficient wetter, but dusts made directly from unformulated active will usually contain an added wetting agent. Dry solid anionic or nonionic wetters are preferred.

Dust formulations will normally contain from 2.0 weight percent to 25 weight percent of active material, from 0.005% to 1.0% wetting agent, and from 2% to 20% light grinding aid diluent and the balance dense, rapid settling diluent. If made by diluting a prepared wettable powder, it will also contain a small amount of dispersing agent which has no active roll when the composition is used as a dry dust.

(C) Liquid concentrates.—Liquid concentrates are formulated by combining the compounds of this invention with a suitable organic liquid. The active component may be completely dissolved in the organic liquid or it may be a finely ground suspension in a non-solvent liquid. Suitable organic liquids include alkylated naphthalenes; xylene; high molecular weight ketones such as isophorones, dibutyl or diamyl ketone; esters such as amyl acetate, and normal or iso paraffins.

Such liquid concentrates are suitable for extension in additional organic liquids, or for dilution in water. Where the concentrate is used by extension with water, a suitable emulsifier is incorporated in the concentrate. Most preferred emulsifiers are blends of oil soluble sulfonates and nonionic polyoxyethylene glycol esters or ethers of fatty acids or alkylated phenol.s The active component in liquid concentrates will be present at from 10 weight percent to about 40 weight percent. Combined emulsifiers will be present at from 3 weight percent to about 10 weight percent and the balance will be an organic carrier liquid or solvent.

Formulations such as those described above containing as the active one or more compounds of this invention can be applied for growth regulant effect as foliar sprays, foliar-soil sprays or mixed with the soil prior to planting.

Of these, the foliar and foliar-soil sprays are preferred.

Depending on the effect desired, the method of application and the plant treated, one or more applications may be required. When a foliar spray or foliar-soil spray is employed, the timing of the application will depend upon the plant treated. Generally, the first application is made to legumes at the time the first trifoliate leaf is expanding and later applications are made at regular intervals during the growing season. However, when only one application is used, it is often most advantageous to spray at the time the first trifoliate leaf is expanding, although certain species respond best when treatment is delayed until just before flowering.

Rates of one-quarter to ten kilograms per hectare of these materials can generally be used to obtain the desired effects. For foliar applications, rates of one-half to six kilograms per hectare are preferred, while rates for soil applications may be higher depending on soil type, plant species and the result desired.

The compositions of this invention for application as a spray are usually extended with water and are present in the final formulation as a solution, suspension or emulsion. The total volume of spray applied will depend on the strength of the formulation used, the plant modifying effect desired and the time of application. Generally, the volume of spray applied will be from about twenty to about one thousand liters per hectare.

As is evident from the earlier discussion, the compounds of this invention can also be applied in dry form as a dust. When such method of application is employed, care should be taken to apply the dust to moist foliage to obtain best results from the application. Therefore, application should be made when the plants to be treated are wet with dew, shortly after a rain, or shortly after watering.

The following examples will further illustrate the formulation and application of the compounds of this invention. Parts and percentages in the following examples are by weight unless otherwise specified.

EXAMPLE 3

A wettable powder of the following formula is prepared.

| | Percent |
|---|---|
| 3,4-dichloro-N-(tetrahydro-2-pyranyl)aniline | 75 |
| Dioctyl sodium sulfosuccinate (Areosol OTB) | 1.0 |
| Sodium lignin sulfonate (Marasperse CB) | 3.0 |
| Synthetic fine silica (Hi Sil 233) | 21.0 |

The above components are blended and micropulverized until substantially all particles are smaller than 50 microns. Two and one-half kilograms of the formulation of Example 3 are applied in 400 l. of water suspension to one hectare of snap bean as the first trifoliate leaf is expanding. At harvest, the treated plants yield more beans than a similar hectare of untreated beans.

EXAMPLE 4

A wettable powder of the following formula is prepared.

| | Percent |
|---|---|
| 4-chloro-3-nitro-N-(tetrahydro-2-pyranyl)aniline | 50 |
| Alkyl naphthalene sulfonic acid, Na salt | 1.75 |
| Oleyl ester of sodium isethionate | 1.0 |
| Attapulgite clay | 47.25 |

The above components are blended and micropulverized as in Example 1.

One half kilogram of the formulation of Example 4 is suspended in 200 liters of water and sprayed on one hectare of thickly planted lima beans as the first trifoliate leaf is expanding. Two additional applications at the same rate are made at two week intervals following the initial treatment. The treatments give a shorter, more compact plant which does not lodge and yields more useful beans when harvested than thickly planted but untreated plants.

EXAMPLE 5

A wettable powder of the following formula is prepared.

| | Percent |
|---|---|
| 2-fluoro-N-(tetrahydro-2-pyranyl)aniline | 50 |
| Polyoxyethylene ether of dodecylphenol | 3.0 |
| Diatomaceous silica | 47.0 |

The silica and active component are dry blended. The combined wetter-disperser is then sprayed on while the mass is tumbling and the resultant mixture is finally micropulverized.

One kilogram of the above composition is suspended in 500 l. of water and sprayed over a hectare of dry beans as the second trifoliate leaf is expanding. The treatment results in a shorter more compact plant that is easier to machine harvest and that yields more of the desirable immature beans.

EXAMPLE 6

A wettable powder of the following formula is prepared.

| | Percent |
|---|---|
| 2,4,5-trichloro-N-(tetrahydro-2-pyranyl)aniline | 80.0 |
| Sodium lauryl sulfate | 1.5 |
| Low viscosity methyl cellulose | 0.3 |
| Synthetic sodium aluminosilicate | 18.2 |

The above components are blended, micropulverized, then air milled until substantially all particles are less than 10 microns.

Two kilograms of the formulation of Example 6 are suspended in 800 liters of water and sprayed on one hectare of soybeans planted in 24 inch rows. Treatment is made just as the first plants begin to flower. This treatment results in an increase in bean yield compared to a similar hectare of untreated soybeans.

EXAMPLE 7

A dust having the following formula is prepared.

| | Percent |
|---|---|
| 4-chloro-N-(tetrahydro-2-pyranyl)aniline | 5 |
| Attapulgite clay | 5 |
| Sodium lauryl sulfate | 0.2 |
| Micaceous talc | 89.8 |

The active material, attapulgite and wetting agent are first blended and micropulverized then mixed with the talc in a ribbon blender.

One hundred kilograms of the dust formulation of Example 7 is applied in the early morning hours when the plants are wet with dew to one hectare of snap beans when the third trifoliate leaf is just expanding. An airplane is used to make the application. The treatment increases the production of marketable snap beans over a hectare of similar untreated beans.

EXAMPLE 8

A dust of the following formula is prepared.

| | Percent |
|---|---|
| 3,4-dibromo-N-(tetrahydro-2-pyranyl)aniline | 10 |
| Sodium laurylsulfate | 0.1875 |
| Low viscosity methyl cellulose | 0.0375 |
| Synthetic sodium alumino silicate | 2.276 |
| Pyrophyllite | 87.499 |

Ten parts of the wettable powder formulation of Example 6 are blended with 70 parts of pyrophyllite in a ribbon blender to produce the above dust formualtion.

One hundred kilograms of the dust formulation of Example 8 is applied to one hectare of soybeans when the foliage is damp. The application is made when approximately 5% of the plants are showing their first flowers. The treatment results in the growth of a bushy more compact plant that does not lodge. The plants in the treated plot produce more soybeans when harvested than a similar but untreated one hectare plot.

EXAMPLE 9

An emulsifiable liquid of the following formula is prepared.

| | Percent |
|---|---|
| 3,4 - dichloro - N - methyl - N - (tetrahydro - 2- pnanyl)aniline | 25 |
| Blend of an amine salt of dodecylbenzene sulfonate and polyoxyethylene sorbitan monooleate | 10 |
| Xylene | 65 |

The above components are mixed and stirred until a homogeneous solution results.

One kilogram of the formulation of Example 9 is emulsified in 100 liters of water and applied to the foliage of dry beans just as the second trifoliate leaf is expanding. This treatment produces a shorter more compact bean plant that does not lodge, is easier to combine and yields more dry beans than a similar untreated hectare.

EXAMPLE 10

An emulsifiable liquid of the following formula is prepared.

| | Percent |
|---|---|
| 2,3,6-trichloro-N-(tetrahydro-2-pyranyl)aniline | 20 |
| Blend of oil-solube sulfonates and polyoxyethylene ether of nonylphenol | 8 |
| Alkylated naphthalene, principally α-methylnaphthalene | 72 |

The components are mixed together to form a homogeneous solution that mixes readily with water to form a stable emulsion.

Five kilograms of the formulation of Example 10 is emulsified in 500 liters of water. The emulsion is sprayed on one hectare of soybeans growing in narrow rows. The spray is applied when from 5 to 10% of the plants are showing their first flowers. The treatment results in the growth of more compact soybean plants which yield more beans at harvest than soybean plants in a similar but untreated one hectare plot.

I claim:
1. A compound of the following formula

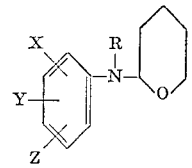

where:
R is hydrogen or alkyl of one through four carbons;
X is halogen;
Y is hydrogen, chlorine, bromine, alkyl of one through four carbons, alkoxy of one through four carbons, NO₂ or CF₃; and
Z is hydrogen or chlorine.

2. A compound of claim 1 where R is hydrogen; X is chlorine, Y is chlorine, and Z is hydrogen or chlorine.

3. The compound of claim 1 which is 3,4-dichloro-N-(tetrahydro-2-pyranyl)aniline.

References Cited

UNITED STATES PATENTS

| | | | |
|---|---|---|---|
| 2,350,446 | 6/1944 | Carruthers et al. | 260—345.1 |
| 3,419,555 | 12/1968 | Jenkins | 260—345.1X |

JOHN M. FORD, Primary Examiner

U.S. Cl. X.R.

71—88